(12) United States Patent
Despesse (10) Patent No.: US 8,174,163 B2
(45) Date of Patent: May 8, 2012

(54) DEVICE FOR ASSISTING RELATIVE MOVEMENTS BETWEEN TWO PARTS OF A MECHANICAL SYSTEM, FORMING A VARIABLE CAPACITANCE DEVICE

(75) Inventor: Ghislain Despesse, Saint Egreve (FR)

(73) Assignee: Commissariat a l'Energie Atomique, Paris (FR)

( * ) Notice: Subject to any disclaimer, the term of this patent is extended or adjusted under 35 U.S.C. 154(b) by 436 days.

(21) Appl. No.: 11/994,125

(22) PCT Filed: Jul. 6, 2006

(86) PCT No.: PCT/EP2006/063983
§ 371 (c)(1),
(2), (4) Date: Dec. 28, 2007

(87) PCT Pub. No.: WO2007/006731
PCT Pub. Date: Jan. 18, 2007

(65) Prior Publication Data
US 2008/0211342 A1    Sep. 4, 2008

(30) Foreign Application Priority Data
Jul. 8, 2005   (FR) ...................................... 05 52113

(51) Int. Cl.
*H02N 1/00*   (2006.01)
(52) U.S. Cl. ............ 310/309; 322/2 A; 361/277; 384/42
(58) Field of Classification Search .................. 310/309, 310/308; 322/2 A, 2 R; 361/277, 287, 289, 361/292, 296; 324/660; 340/870.37; 384/42, 384/276, 277
See application file for complete search history.

(56) References Cited

U.S. PATENT DOCUMENTS

| | | | |
|---|---|---|---|
| 2,266,057 A | | 12/1941 | Massolle |
| 3,107,326 A | * | 10/1963 | Denholm ...................... 322/2 A |
| 3,412,318 A | * | 11/1968 | Robinson et al. ............. 322/2 R |
| 3,414,742 A | | 12/1968 | Fisher et al. |
| 4,225,801 A | * | 9/1980 | Parker, Jr. ..................... 310/308 |
| 4,789,802 A | * | 12/1988 | Miyake ......................... 310/309 |
| 4,871,266 A | * | 10/1989 | Oda .............................. 384/42 |

(Continued)

FOREIGN PATENT DOCUMENTS

JP    64-012877    *   1/1989

(Continued)

OTHER PUBLICATIONS

Machine Translation of JP 2000-152669, "Micro Actuator", May 30, 2000, Tanakari Nabeshima.*

(Continued)

*Primary Examiner* — Karl Tamai
(74) *Attorney, Agent, or Firm* — Oblon, Spivak, McClelland, Maier & Neustadt, L.L.P.

(57) ABSTRACT

A device for assisting a relative movement of two parts of a mechanical system, for example a ball bearing or a gear device, configured to form a device with variable capacity, thereby enabling mechanical energy to be recovered and converted into electrical energy. At least one among driving and driven elements of the device includes a conductive zone separated by a variable distance during the relative movements of the elements with respect to each other of the conductive parts of the device, the conductive zone and the conductive parts being coupled to different equipotentials.

30 Claims, 4 Drawing Sheets

U.S. PATENT DOCUMENTS

| | | | | |
|---|---|---|---|---|
| 4,922,164 A | * | 5/1990 | Jacobsen et al. | 310/309 |
| 4,990,813 A | * | 2/1991 | Paramo | 310/309 |
| 5,093,594 A | * | 3/1992 | Mehregany | 310/82 |
| 5,237,234 A | | 8/1993 | Jebens et al. | |
| 6,218,803 B1 | * | 4/2001 | Montagu et al. | 318/662 |
| 2008/0211342 A1 | * | 9/2008 | Despesse | 310/309 |

FOREIGN PATENT DOCUMENTS

| | | | |
|---|---|---|---|
| JP | 01012877 | * | 1/1989 |
| JP | 1-107667 | | 4/1989 |
| JP | 05300759 | * | 11/1993 |
| JP | 2000-152669 | * | 5/2000 |
| WO | WO 02/103881 A2 | | 12/2002 |

OTHER PUBLICATIONS

Scott Meninger, et al., "Vibration-to-Electric Energy Conversion", IEEE. Transactions on Very Large Scale Integration (VLSI) Systems, 9(1)2001, pp. 48-53.

U.S. Appl. No. 11/994,125, filed Dec. 28, 2007, Despesse.

U.S. Appl. No. 13/120,805, filed Jun. 10, 2011, Despesse.

* cited by examiner

DEVICE FOR ASSISTING RELATIVE MOVEMENTS BETWEEN TWO PARTS OF A MECHANICAL SYSTEM, FORMING A VARIABLE CAPACITANCE DEVICE

TECHNICAL FIELD AND PRIOR ART

The present invention concerns the systems having a non-constant capacitance of which the variations originate from the movement of a mass driven by mobile means between them. The invention relates in particular to devices for assisting the movement which enable the electrical energy to be recovered via electrostatic conversion during the implementation thereof; other uses of the variations of the capacitance may also be provided.

Numerous mechanical systems set an element in motion in relation to another during the operation thereof. For example, a ball bearing comprises two relatively mobile parts the movement of which causes the displacement of elements limiting the friction. The systems are optimised for the function of limiting frictions and any resulting loss of energy, and are only considered for the mechanical movement transmission effect thereof.

However, the relative movement between two devices is also known for generating energy. For example, the document WO 02/103881 proposes a recovery of the energy of a mobile system via magnetic principle, wherein a magnetic mass is animated with oscillations in relation to a fixed guide, which causes a variation of the magnetic field induced, a variation converted into electrical energy with the aid of a coil. Moreover, the documents U.S. Pat. No. 2,266,057 or U.S. Pat. No. 3,414,742 describe the electrostatic conversion of a mechanical rotation energy of a rotor into electrical energy.

In all cases, it concerns converting the mechanical energy originating from the displacement of an insulated animated object into electrical energy.

DESCRIPTION OF THE INVENTION

The invention proposes to recover the energy originating from mechanical systems operating with relative movement between several elements. More generally, the invention relates to the generation of capacitive variations and the use thereof. The invention finds a particular application for the systems for assisting the movement of the ball bearing and gear type, but may also be suitable for any system of similar principle.

Under one of the aspects thereof, the invention concerns a device comprising two driving parts mobile with respect to each other and defining a space between them. The device may be of the "ball bearing" type, with relative rotation between the driving parts which define an annular space, or the "slide rail" type, with translation between two mutually parallel driving parts.

By their movement, the driving elements make one or more mobile elements roll in the space such that they move relatively in relation to the driving parts. In particular, the mobile elements are spheres or cylinders. The displacement may be guided, controlled, with teeth present at the surface of the elements in relation, or accompanied with a deformation of the rolling element positioned in compression in the space. The rolling elements are therefore in mechanical contact with the driving elements; they may be associated with sliding elements placed between them and which they drive.

The device comprises moreover at least one conductive part and one conductive zone which are separated from one another by a variable distance according to the relative displacement of the elements between them: if each one of the conductive zones and parts is placed at a different equipotential, a capacitance variation occurs during the activation of the device. The device may comprise means for measuring The capacitance variations and/or transforming same, for example by electrostatic principle, into electrical energy.

The conductive part and the conductive zone may be located on the same element, or on two different elements; advantageously, several elements are in contact in order to form a conductive part consisting of the main part of the device, with the exception of the conductive zones. The separation between conductive parts and zones may be produced via insulating parts; furthermore, it is possible to have several conductive zones separated by insulating parts on the same element and/or the distance of which may also vary during the displacement.

Various embodiments of the invention are provided: in particular, the rolling elements may comprise insulating parts which, according to their orientation, move away from or close in on the conductive zones of a driving element with the conductive part of the other driving element, or insulate the conductive portions of the rolling elements which may be located at different distances or potentials. According to another embodiment, the rolling elements are conductive and one of the driving elements at least equally: during the displacement, the rolling elements move away from or close in on the conductive zones located along their direction of displacement.

The invention also concerns a method generating one or more variable capacities, which may be transformed into electrical energy, via relative displacement of the elements of the device.

Under another aspect, the invention relates to the use of a device for assisting the movement, in particular a ball bearing or a bearing or a slide rail, for generating a variable capacitance. Various applications such as the conversion into electrical energy are provided.

BRIEF DESCRIPTION OF THE DRAWINGS

The characteristics and advantages of the invention will be better understood upon reading the following description and referring to the drawings appended, given by way of illustration and distinctly limitative.

DETAILED DESCRIPTION OF SPECIFIC EMBODIMENTS

Figures 1A, 1B:
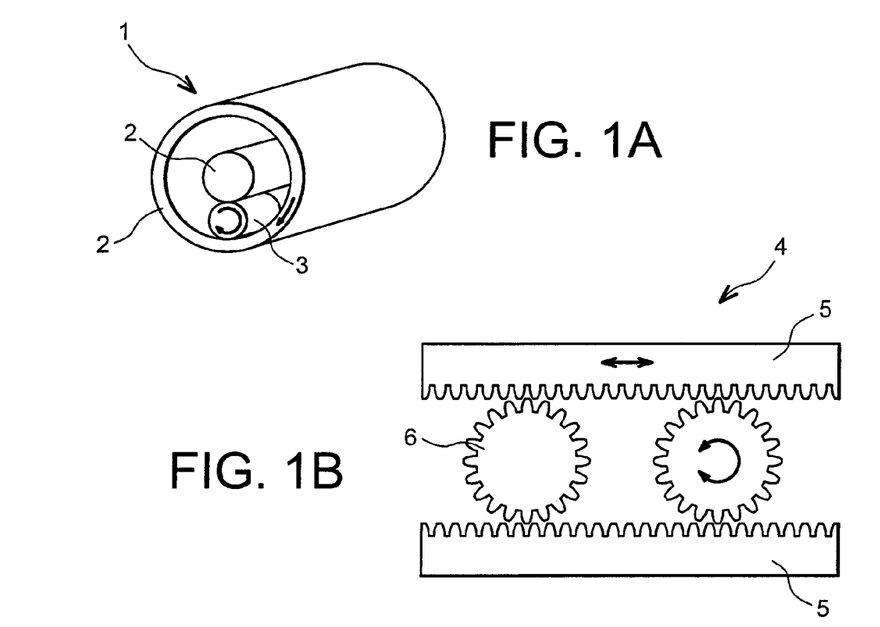
FIGS. 1A, 1B, 1C illustrate various movement assistance systems.

In a mechanical system comprising two parts in movement with respect to each other, devices exist enabling the displacement to be assisted, in particular for limiting the friction. Thus, such as illustrated in FIG. 1A, a device 1, of the bearing or ball bearing type, usually comprises two elements 2, rotary with respect to each other without contact, connected to each one of the moving parts of the system, defining between them a space inside of which one or more driven elements 3, cylindrical or spherical, roll during the setting in motion.

It may be advantageous to equip the rolling elements as well as the driving elements with teeth, The type of engagement enabling sliding to be prevented between the elements in contact and the spacing to be preserved between the rolling elements without using additional means for maintaining a determined spacing. In FIG. 1B, such a device 4 comprises two first elements 5 connected to the parts of the system, equipped with teeth and mobile in translation with respect to each other, which define between them a space wherein a second element 6 equipped with teeth being able to engage with those of the first driving elements 5 may rotate.

Figure 1C:
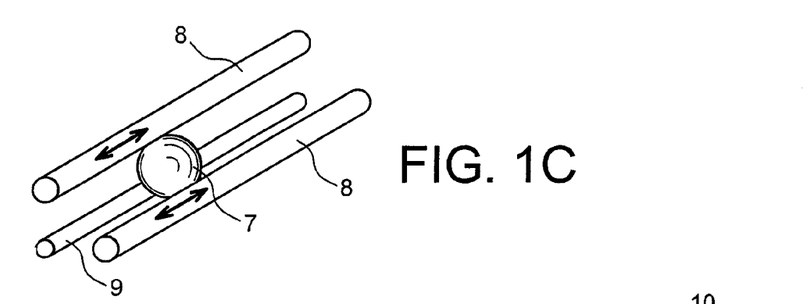

The two illustrative examples may have numerous variants. The bearing in rotation in FIG. 1A may thus be produced as a sliding support, with two flat surfaces mobile in translation one parallel to the other driving the cylinders located between same, in the manner of the displacement on wooden logs. Another embodiment, illustrated in FIG. 1C, concerns the presence of a guiding cage for a spherical driven element 7 comprising relatively mobile elements, here two rods 8 mobile in relation to a third 9. Moreover, all of the driving elements 2, 5, 8, 9 or some of them may form part of the mechanical system as such, the assistance being provided by the single driven element 3, 6, 7.

The invention may apply to all of the devices of which the examples 10 are illustrated in FIGS. 2 to 7, which may be independent or assist the movement of more complex systems, comprising at least two driving elements 12, 14 mobile with respect to each other and defining a space 16 between them, wherein at least one driven element 18 moves via rolling during the relative movement of the driving elements 12, 14. The driven elements 18 are indeed only linked to each one of the driving surfaces via the mechanical contact. The dimensioning of the various elements 12, 14, 18 and their shape depends on the use which is made of the device 10.

According to the invention, one of the elements 12, 14, 18 comprises a conductive zone which is electrically insulated, in particular via the presence of an insulating part, a conductive part of the device 10 which may be located at the level of one or more other elements or within the same element. A difference of potential can thus be produced between the conductive zone of the element concerned and the conductive part of the device 10 as such. According to the invention, the conductive zone is separated from the conductive part by a certain distance, and the device is arranged such that the distance varies during the relative displacement of the driving elements, and therefore the rotation of the driven elements.

The variation of the distance is coupled with a variation of the capacitance of the conductive zone/conductive part assembly: during the relative movement of the elements 12, 14, 18 between them, a variation of the capacitance over time and/or space is generated; it may be measured and/or converted into electrical energy via suitable means, known for example by Meninger S and coll.: "Vibration-to-electric Energy Conversion", *IEEE Transactions on Very Large Scale Integration (VLSI) Systems;* 2001, 9(1): 48-53, and which will not be described further.

By "distance variation", it should be understood that the conductive part and the conductive zone are separated by an insulating space of which the dimensions vary physically, or by a fixed space which comprises a discontinued dielectric medium that may take various relative orientations such that the resulting dielectric constant takes different values according to the displacement. In particular, the dielectric medium comprises an insulating region and a conductive region, the conductive region being able to extend the conductive zone (respectively part) or be separated from it, such that the path of the electrons in the insulating region located between the conductive zone and part differ according to the location of the conductive region (see FIG. 2A). In fact, conductive "zone" and "part" do not necessarily correspond to physical elements but may, according to the operation of the device and the orientation of its component elements, correspond to different portions of the device according to the invention.

The conductive zones may thus be integrated into a driving element, with alternation of insulating parts in the direction of displacement, or into the driven elements; the conductive part may consist entirely of the other elements, or even the assembly of the device with the exception of the necessary conductive zones and insulating parts. The distance variation may occur within the driven element, or by virtue of its movement. The variation of the distance may be provided by the suitable positioning of the insulating parts separating conductive zones and parts.

Figure 2A:
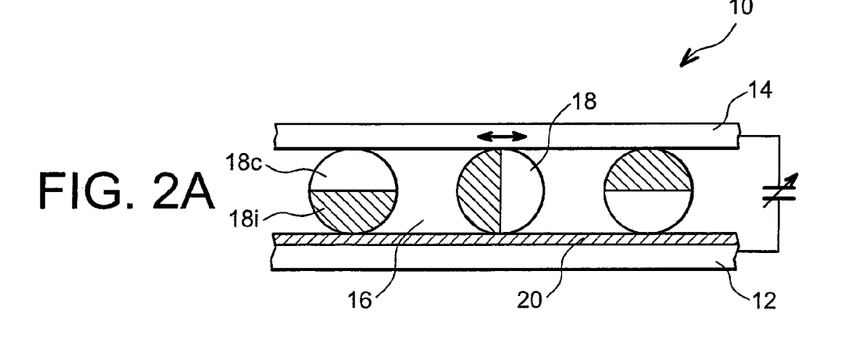
FIGS. 2A, 2B, 2C show variants of an embodiment of a device according to the present invention.

By way of simple example, considering FIG. 2A, the driving element 14, which is conductive, is sliding parallel to the driving element 12, which is conductive and coated with an insulating layer 20; the relative sliding movement thereof drives the rolling elements 18, which may be spheres allowing any displacement of the driving elements 12, 14 with respect to each other or cylinders enabling a perpendicular translation on their axis. The rolling elements 18 comprise a conductive part 18$c$ and an insulating part 18$i$; due to their rotation, the distance between the potential of the conductive zone 12 and that of the conductive part 14 varies, according to the position of the conductive part 18$c$ which indeed extends the conductive part 14 (which means that the resulting dielectric constant between the driving elements 12, 14 separated by a fixed distance varies). The capacitance between the driving elements 12, 14 therefore varies, which it is possible to verify and measure via suitable means; via electrostatic method, it is thus possible to convert one part of the mechanical energy linked to the displacement of the surfaces 12, 14 into electrical energy.

According to the configuration of the insulating 18$i$ and conductive 18$c$ parts, if an electrical contact between the driving elements 12, 14 is not possible, for example if the insulating part 18$i$ comprises more than half of the circumference of the rolling element 18, it is possible not to coat with an insulating layer 20 one of the driving elements 12.

Figure 2B:
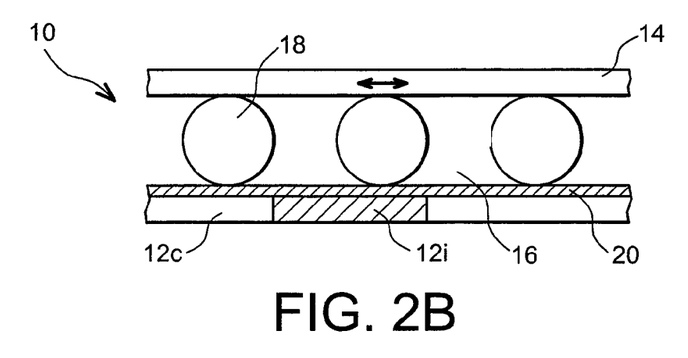

A variant of the embodiment may comprise entirely conductive driven elements 18, which in fact extend the conductive part consisting of one of the driving elements 14: FIG. 2B. The other driving element 12, coated with an insulating layer 20, further comprises in this case insulating parts 12$i$ separating the conductive zones 12$c$ in the direction of displacement of the rolling elements 18. During the relative displacement of the driving elements 12, 14, the rolling elements 18 will alternate their passage on the conductive 12$c$ or insulating 12$i$ zones, and the distance between the conductive part 14, 18 and the conductive zone 12$c$ varies between the minimum thickness of the insulating layer 20 and more than half of the width of the insulating part 12$i$, thus generating a capacitance variation.

Figure 2C:
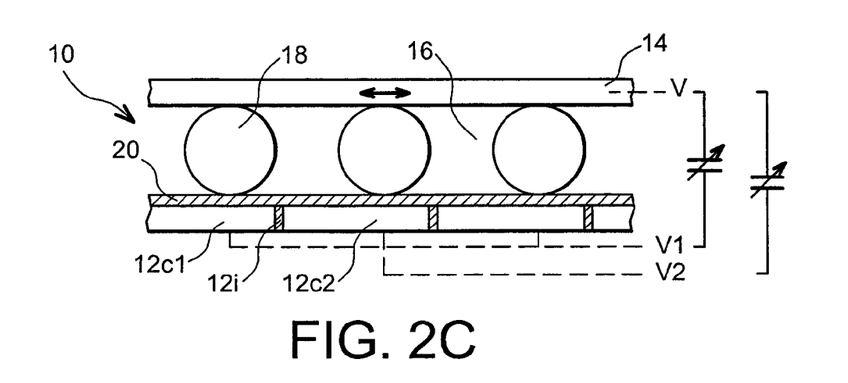

A variant of the embodiment moreover enables two variable capacitances to be created in parallel: FIG. 2C. The insulating parts 12$i$ are here reduced to a thickness just sufficient for separating the conductive zones 12$c_1$ and 12$c_2$ connected to the different equipotentials V1 and V2. The capacitance variation is inherent to the fact that the driven element 18 approaches the constant potential V of the first driving element 14, with one equipotential V1 or the other V2 of the second driving element 12, thus producing a capacitance variation between the potential V and the potentials V1 and V2; optionally, a capacitance variation may also occur between the various potentials V1 and V2 of the conductive parts 12c.

It is advantageous that the insulating parts 12i form regular lines perpendicular to the direction of rolling of the driven elements 18, or a checkerboard if a two-way displacement is allowed with the rolling elements in the spherical shape. Other geometries are possible, with even more than two equipotentials for the same driving element 12.

Figure 3A:
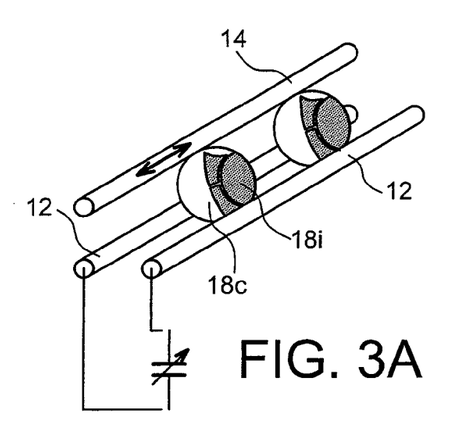
FIGS. 3A and 3B show another variant of the device according to the invention.
Figure 3B:
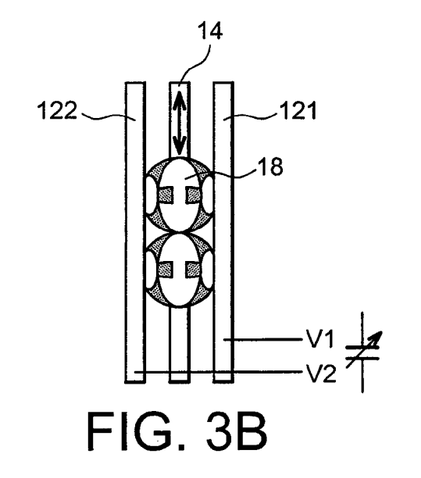

Another variant is illustrated in FIGS. 3A and 3B, wherein one of the driving elements 12 comprises "physically" separated conductive zones 121, 122. Here again, the spherical rolling elements 18 comprise insulating parts 18i which, according to the orientation of the spheres, cover more or less the distance separating the conductive zones 121, 122 placed at different potentials. When the driving element 14 moves parallel to the two driving bars 121, 122, it makes the balls 18 roll of which the conductive parts 18c are electrically connected by mechanical contact either to one, or to the other of the bars 121, 122, and are therefore to one or the other potentials V1 and V2: the distance separating the two potentials V1 and V2 varies, as well as the capacitance. The shape and the size of the insulating parts 18i of the driven element 18 may of course be adapted according to the results desired, for example in order to obtain more favourable effects to the capacitance variation between the conductive elements 18c of the various rolling elements 18.

It should be noted that in the embodiment, it is possible to use the capacitance variation directly in the rolling element 18, for example with the aid of means for using the electrical energy, such as a built-in sensor.

Figure 4:
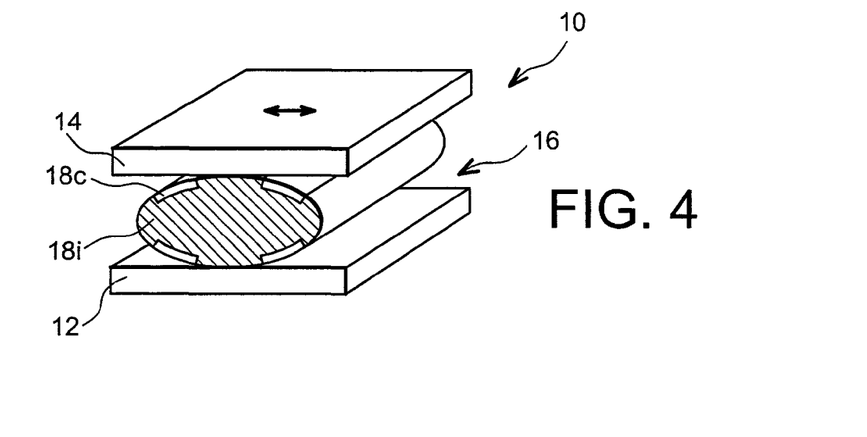
FIG. 4 illustrates an alternative embodiment of a device according to the invention.

Such a use inside driven elements 18 may also be envisaged for malleable elements 18: according to one embodiment illustrated in FIG. 4, the rolling element 18 comprises a malleable cylinder or sphere containing conductive parts 18c, such as for example a polymeric ball 18i metallised in places. When the driving element 14 moves parallel to the driving element 12, the driven elements 18, placed in compression in the space 16, deform and roll in a one-way or two-way manner. The deformation causes distance variations, and therefore capacitance variations, between the various conductive parts 18c, which may generate electricity within the driven element 18 itself, in order to be used for example for supplying a sensor. In the embodiment also, it is possible to bring the capacitance variation or the electrical energy towards the exterior with the aid of conductive contacts on the periphery.

In general, the capacitance variation may take place inside rolling elements 18 and/or between them, or between the driven 18 and driving 12, 14 elements, or inside the driving elements 12, 14, or in the space 16. Moreover, all of the geometries of driven elements may be envisaged: solid or malleable cylinder, toothed gear or cylinder, solid or malleable sphere; the driving elements 12, 14 are usually solid, produced in conductive metal comprising possible insulating parts. According to the geometry of the movement and the nature of the driving elements, the rolling elements 18 may be manufactured in insulating material partially metallised on the surface, or comprising conductive inserts, or they may comprise additional rigid insulating and conductive parts.

Figure 5:
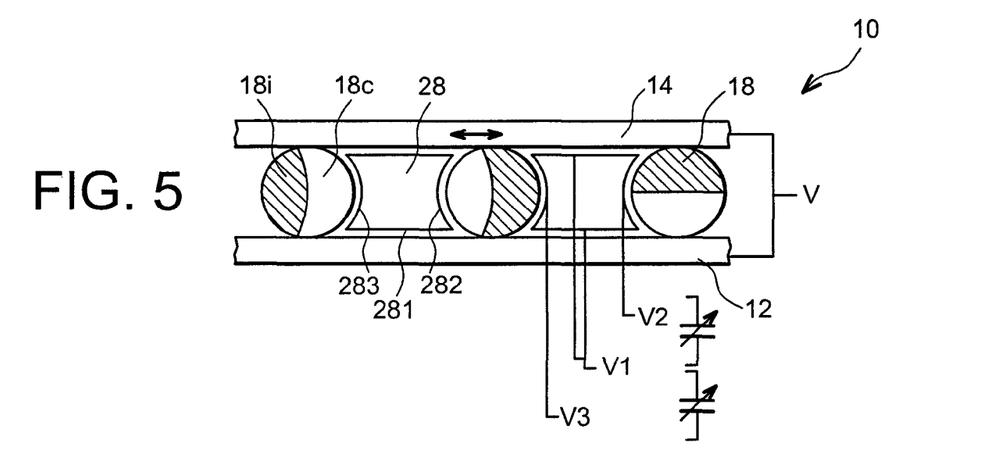
FIG. 5 shows another embodiment of a device according to the invention.

In particular, it is possible to associate the second sliding driven elements 28 with the rolling driven elements 18 and of additional shapes: FIG. 5. The relative position of the sliding elements 28 in relation to the driving elements 12, 14 only varies in the direction of the displacement, without combination with a rotation. Conversely, during their rotation, about an axis or a point, the rolling elements 18 have a different face than the sliding elements 28. In particular, the sliding elements 28 may have three zones 281, 282, 283 of different equipotentials V1, V2, V3 (respectively 281 opposite and under the influence of the driving elements 12, 14, and 282, 283 opposite and mainly under the influence of the two consecutive rolling parts 18), the conductive parts of the driving 12, 14 and rolling 18 elements being at the same potential V. According to the distance between the conductive part 18c of the rolling element 18 and the corresponding zone 282, 283 of the sliding element 28, i.e. according to the relative position of the insulating part 18i of the rolling element 18, the capacitance differs: a capacitance variation is produced between V and V2 or V3. Likewise, the various equipotentials V1, V2, V3 all see, two by two, a capacitance variation enabling electrical energy to be arranged within the sliding element 28.

It is of course possible to have a configuration between the sliding elements 28 and the driving surfaces of the elements 12, 14 such that a capacitance variation between V and V1 is generated, possibly in phase with that generated between V2 (or V3) and V, so as to amplify the capacitance variation between each one of the potentials.

Although up to here described in a "slide rail" configuration wherein the driving elements slide one parallel to the other, the invention applies just as much to the "ball bearing" configurations wherein two driving elements 12, 14 are rotary with respect to each other; the abovementioned embodiments moreover adapt immediately, by "incurving" the driving elements illustrated and by closing them in on themselves in order to form an annular space 16.

Figure 6:
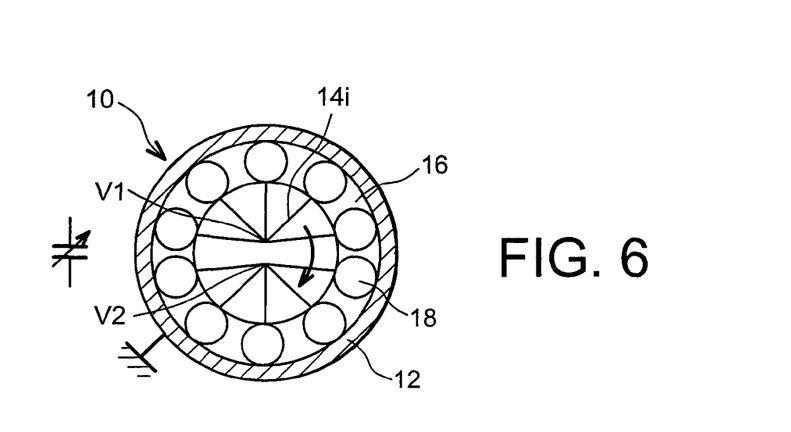
FIG. 6 illustrates another embodiment of a device according to the invention.

An embodiment is detailed in FIG. 6: an annular space 16 enables the guided rolling of conductive driven elements 18 via the relative rotation of the axis 14 in relation to the conductive driving element 12. The central part 14 comprises insulating parts 14i enabling separation of the conductive sectors distributed in such a manner that, in certain angular positions of the axis 14 in relation to the ring 12, they form a large capacitance, and in others a small capacitance, in relation to the ring 12. If these conductive sectors are assembled together in two equipotentials V1 and V2, a time variation of the capacitance between the two equipotentials is obtained during the relative rotation of each one of the elements 12, 14, 18.

It is also possible to obtain a capacitance variation between the driving element 12 and the axis 14 assembling together all of the sectors to the same potential, for example by short-circuiting V1 and V2, and by displaying the capacitance variation between the rotating element 14 and the outer element 12.

Also in this embodiment, an additional displacement may be combined, with translation of the driving elements 12, 14 in a direction perpendicular to the axis of rotation.

It is possible in this embodiment, as in the case of that of FIG. 2C, to position a checkerboard or lines on the outer surface of the axis 14. Moreover, if having electrical energy on the outer part 12 is desired, the roles may be reversed, with for example coating of the inner surface of the ring 12 with a checkerboard.

In particular for a rotary geometry, lateral guides are often present on one of the driving elements 12, 14 or both such as to prevent the rolling elements 18 from coming out of the space 16 during the displacement thereof. It is therefore further possible to take advantage of the type of guiding.

Figure 7A:
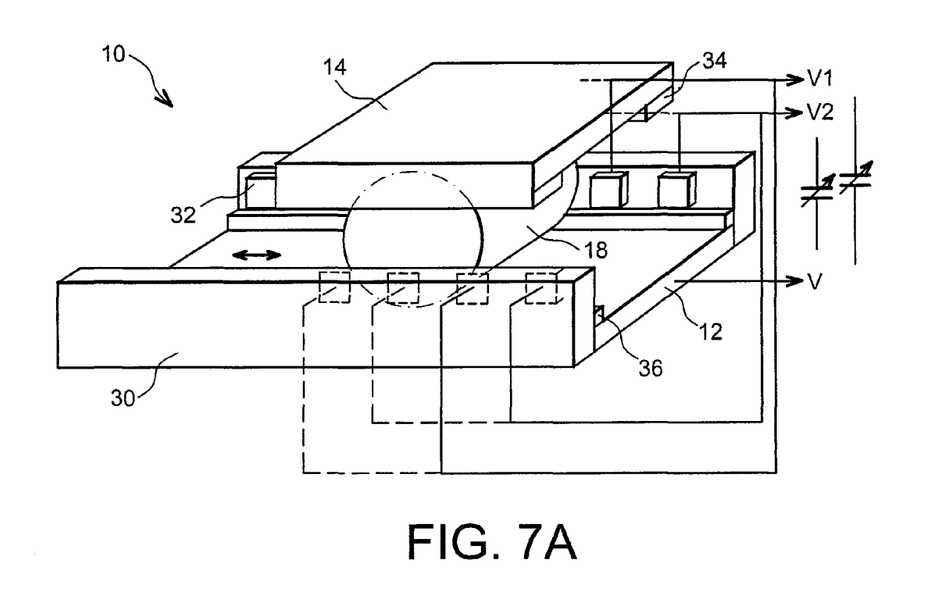
FIGS. 7A, 7B, 7C present various views of another embodiment of a device according to the invention.
Figure 7B:
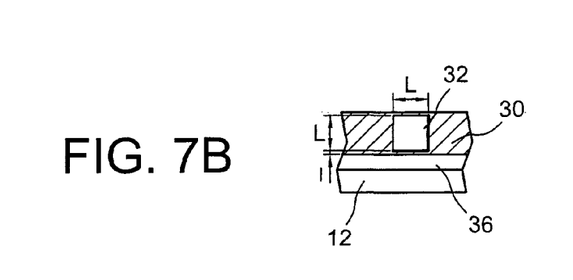
Figure 7C:
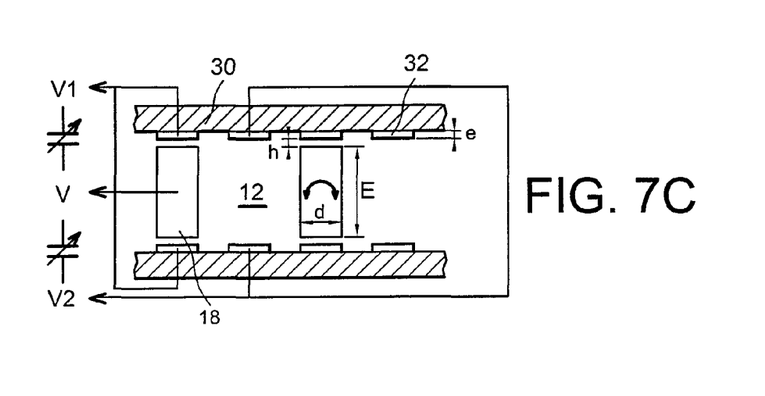

Thus for example, in a device such as illustrated in FIG. 7, the rolling elements 18 and the driving surfaces 12, 14 are conductive and at the same potential V. Although illustrated flat, the configuration may be used for a "ball bearing": the surfaces 12, 14 are therefore annular, for example with an annular space 16 with a 5.5 cm inside diameter, and with a 7.5 cm outside diameter; in particular, there may be an outer rolling surface 14 of 24 cm in length, for a width of 2.5 cm. Within the framework illustrated, the driven elements are conductive cylinders 18, with a diameter d=1 cm and length E=2 cm. One of the driving surface at least is associated with guiding means; in order to prevent any friction, it is preferable that the free space between the guiding means is of a length greater than the length E of the cylinder 18.

The guiding means 30 associated with one of the driving elements 12 are insulating, with the exception of conductive zones 32, insulated one from the other, and positioned along the direction of displacement of the rolling elements 18. The conductive zones may be integrated into the wall 30, or make them projected; a minimum gap h must however be provided during the movement between the conductive zones 32 and the rollers 18, at least for those which will serve for measuring and/or using a capacitance variation. In the example figured, advantageously, the gap h is around 0.1 mm.

In order to guide more accurately the movement of the rolling elements 18, guiding means 34 may be positioned on either side of the other driving element 14, for example a protrusion. Moreover, in order to provide the distance of the gap h, it is also possible to position a stop 36 on the driving element 12 comprising the guiding element 30 with conductive zones 32.

Due to the mechanical contact thereof, the driven 18 and driving 12, 14, 36 elements (as well as optionally the guiding means 34) are at the same equipotential V. When the outer ring 14 moves about the cylinder 12, the elements 18 are driven in rotation and roll: they pass alternately in front of the conductive zones 32. Advantageously, the number of conductive zones 32 is a multiple of the number of rolling elements 18, for example six rolling elements 18 and twelve pairs of conductive zones 32, distributed homogeneously each side along the circumference of the annular space 16; the spacing between the rolling elements 18 may be provided by inserts for example. The conductive zones 32 may be coupled to one or more equipotentials V1, V2 differing from the equipotential V of the device 10, i.e. driving 12, 14 and driven 18 elements. The displacement of the rollers 18 also produces a capacitance variation between the conductive elements 32 and the equipotential V, a variation that it is possible to use for recovering the electrical energy; reciprocally, it is easy to use the structure 10 as an actuator by sequentially applying electric voltages between the various conductive elements 32 and the various elements of equipotential V.

It may also be provided, in the embodiment, to replace the discrete elements 32 with a continuous conductive layer and the entirely conductive rolling object 18 with a rolling object comprising conductive sectors and insulating sectors.

According to a preferred embodiment illustrated, the conductive zones 32 may be covered to 90% by the end surface of the rolling elements 18 when they are aligned, and may be entirely offset from these same elements during the rolling phase; for example, it concerns squares of 1 cm on the L side spaced out by 1 cm in the direction of rolling, with a thickness of around e=0.1 mm, arranged on an insulating wall 30, and spaced out from the bottom surface, here shown by the projection of the stop 36 by l=1 mm. As for all of the other embodiments, the usual techniques may be used for producing the devices 10 according to the invention, in particular mechanical machining (milling machine, lathe, spark machining, etc) or moulding enable the various elements to be produced. The choice of materials depends on the use which is made of it.

The capacitance C between two spaced out components is given by $$C = \frac{\varepsilon_0 \cdot S}{D},$$

with $\varepsilon_0$ permittivity of the air and S surface opposite the components separated by a distance D.

In the preceding configuration, with six rolling cylinders 18 passing regularly in front of the surfaces 32 with a distance of D=h=0.1 mm in order to be covered by them, there is a maximum capacitance between the potentials of the conductive elements 32 and the rolling element/driving elements assembly:

$$C_{max} = \frac{\varepsilon_0 \cdot S_{tot}}{h} = \frac{\varepsilon_0 \cdot 2 \cdot 6 \cdot \Pi \cdot (5 \cdot 10^{-3})^2}{10^{-4}} = 83 \text{ pF}.$$

The minimum capacitance itself mainly consists of the surfaces opposite the conductive elements 32 and driving element 12, 36:

$$C_{min} = \frac{12 \cdot \varepsilon_0 \cdot 10^{-2} \cdot 10^{-4}}{10^{-3}} = 106 \text{ fF}.$$

This capacitance $C_{min}$ may naturally be minimised by taking a rounded shape for the conductive elements 32, or by using a driving surface 12 conductive only in its centre. This improvement for recovering energy is carried out however to the detriment of the simplicity of production and of the robustness; moreover, the choice made above enables the existing rolling bearings (or any other system for assisting movement) to be adapted to become devices according to the invention.

For an operation known as "with constant load" with a charging voltage equal to U=V−V1=15 V, the energy that can be recovered per cycle is therefore:

$$E_r = \frac{1}{2} \cdot U^2 \cdot \frac{C_{max}}{C_{min}} \cdot (C_{max} - C_{min}) = 7.35 \text{ μJ}.$$

For one revolution of the axis 12, there are 2×3 cycles of capacitive variations during the use in parallel of the capacitive variations between V and V1, and between V and V2. Therefore 6×7.35=44.1 μW is available per revolution/s, i.e. 1.1 mW for 1,500 rpm. If instead of taking a charging voltage of 15 V, 100 V is taken, 49 mW is available for the same speed of 1,500 rpm: these two powers are sufficient for recovering enough energy for supplying one or more sensors, as well as a wireless transmission of data.

In fact, it is sufficient to adapt the charging voltage to the requirements in electrical energy; it is necessary however to bear in mind that the more electrical energy generated, the more mechanical energy absorbed on the axis 12, and therefore the higher the risk of disturbing the natural operation of the device 10.

The dimensioning may take varied values according to the use: the dimensions may in particular be significantly increased for the axles of lorry type vehicles, or significantly restricted for applications in watchmaking. Moreover, the variants of the various embodiments illustrated may be combined.

According to the invention, it is thus possible, from the capacitance variation produced by one or more rolling elements set in motion via rolling or sliding between at least two surfaces relatively mobile with respect to each other, to produce electrical energy that can be used for supplying an electronic circuit, a sensor, or other, via an electrostatic method. The variation of the capacitance may also be used in other types of application, such as the production of variable capacities for electronics, the measurement directly as a sensor of the position of the rolling elements, the measurement of the angular position or of the speed of rotation of the armatures of a mechanical bearing, etc.

It is thus possible to guide and supply a part in motion with the aid of roller bearings of which the rolling elements generate a capacitance variation that can be used for producing electrical energy, and to apply the principle to existing mechanical bearings. Moreover, the devices according to the invention are capable of operating in the opposite direction, i.e. generating a mechanical movement from a source of electrical energy, and producing a mechanical actuator.

The rolling parts are, according to the invention, the subject of a duplication, mechanical guide and generator of capacitive variations. They may moreover be malleable.

The system according to the invention also makes it possible to recover the energy from a free rolling movement, originating from mechanical accelerations, from a fluid movement, or other. For example, an axis in rotation in a ball bearing according to the present invention produces, when it is subjected to accelerations, the setting in motion of the balls, as well as of the outer ring due to its inertia; therefore a capacitance variation occurs that can be transformed into electrical energy. It is thus possible to have energy on an axis, without connection with the exterior, and it is no longer necessary to provide a particular electrical supply and electrical conductors for bringing the electrical energy up to the consumer device.

The invention claimed is:

1. A device with variable capacitance comprising:
at least one rolling element;
at least two driving elements mobile with respect to each other and defining a space between them, space wherein the at least one rolling element is disposed and driven by movement of the at least two driving elements with which the rolling element is in mobile mechanical contact; and
at least one conductive part and at least one conductive zone, at least a part of the at least one rolling element being at least part of the at least one conductive part, the at least one conductive zone being different from the rolling element, the at least one conductive part being electrically isolated from the at least one conductive zone and separated from the at least one conductive zone by a varying distance during relative displacement of the at least two driving elements, such that capacitance between the at least one conductive zone and the at least one conductive part varies.

2. The device according to claim 1, wherein one of the at least two driving elements is the at least one conductive zone.

3. The device according to claim 1, wherein the at least one rolling element is a plurality of rolling elements disposed in the space successively along a direction of displacement, and the device further comprises:

sliding elements arranged between the plurality of rolling elements that sliding in the space, wherein
at least one of the plurality of rolling elements includes the at least one conductive part and an insulating part, and at least one of the sliding element includes the at least one conductive zone that is located at a variable distance from the at least one conductive part of the rolling element due to displacement of the insulating part of the rolling element.

4. The device according to claim 1, wherein the at least one conductive zone and the at least one conductive part form a variable capacitor that has the variable capacitance, and the variable capacitor, when supplied with an initial charge, recovers electrical energy from movement of the at least one rolling element.

5. The device according to claim 4, wherein the electrical energy recovered ($E_r$) per cycle is defined as $$E_r = \frac{1}{2} \cdot U^2 \cdot \frac{C_{max}}{C_{min}} \cdot (C_{max} - C_{min}),$$

with U being an initial charging voltage, $C_{max}$ being a maximum capacitance of the variable capacitor and $C_{min}$ being minimum capacitance of the variable capacitor.

6. The device according to claim 1, further comprising a device that assists the movement of the at least two driving elements by generating movement from a source of electrical energy.

7. A device according to claim 1, wherein the space is annular and the driving elements are rotary with respect to each other.

8. A device according to claim 7, wherein at least one of the driving elements comprises insulating parts separating the conductive zones along a direction of the displacement, and the rolling elements are at least partially conductive, such that the distance between the rolling element and conductive zones varies.

9. A device according to claim 7, wherein an amount of the conductive zones is a multiple of an amount of rolling elements.

10. A device according to claim 7, wherein the at least two driving elements are at a same first potential, and there are a plurality of conductive zones coupled to a second potential different from the first potential.

11. A device according to claim 7, wherein the at least one rolling element is a cylinder, and the at least one conductive zone is disposed to face a circular facet of the cylinder.

12. A device according to claim 1, wherein the driving elements are flat and move in translation one parallel to the other.

13. A device according to claim 1, wherein the rolling element is a cylinder of revolution comprising teeth that engage with teeth placed on a driving surface of the driving elements.

14. A device according to claim 13, wherein at least one of the driving elements comprises insulating parts separating the conductive zones along a direction of the displacement, and the rolling elements are at least partially conductive, such that the distance between the rolling element and conductive zones varies.

15. A device according to claim 1, comprising a plurality of rolling elements located in the space successively along a direction of the displacement.

16. A device according to claim 15, further comprising sliding elements arranged between the rolling elements and driven by the rolling elements by sliding in the space.

17. A device according to claim 16, wherein at least one rolling element comprises a conductive part and an insulating part and a sliding element comprises a conductive zone that may be located at a variable distance from the conductive part of the rolling element due to displacement of the insulating part of the rolling element.

18. A device according to claim 1, wherein the rolling element comprises an insulating part and a conductive part, and at least one of the driving elements comprises a conductive zone, a distance between the conductive zone and the conductive part varying due to displacement of the insulating part of the rolling element.

19. A device according to claim 18, wherein a driving surface of the at least one of the driving elements comprises the conductive zone and is coated with an insulating layer.

20. A device according to claim 18, wherein the other driving element is at least partially conductive.

21. A device according to claim 1, wherein the rolling element is a sphere comprising an insulating portion and a plurality of conductive portions, at least one of the driving element comprises at least one conductive zone and a part arranged parallel in a direction of the displacement of the driving elements, different portions of the sphere being brought into contact with the conductive part and the conductive zone of the driving element during the rolling, making the distance vary between two potentials that may be connected to them.

22. A device according to claim 1, wherein each rolling element is malleable and placed in a position compressed in the space such that the relative movement of the driving elements causes a deformation of the rolling element, the rolling element comprising an insulating part separating at least one conductive zone and a part, the distance separating them varying during the deformation.

23. A device according to claim 22, wherein one of the driving elements is at least partially conductive.

24. A device according to claim 1, wherein at least one of the driving elements comprises insulating parts separating the conductive zones along a direction of the displacement, and the rolling elements are at least partially conductive, such that the distance between the rolling element and conductive zones varies.

25. A device according to claim 24, wherein the space between the conductive zones is constant in the direction of displacement.

26. A device according to claim 24, wherein the insulating parts of the driving element are located on guiding means associated with a driving surface of the driving element such that the rolling element remains between the guiding means.

27. A device according to claim 24, further comprising means for measuring the capacitance variation between two separate conductive zones.

28. A device according to claim 24, further comprising means for measuring the capacitance variation between a conductive zone and a conductive part.

29. A device according to claim 1, further comprising means for measuring the capacitance variation between a conductive zone and a conductive part.

30. A method for generating variable capacitance comprising relative displacement of the driving elements of a device according to claim 1.

* * * * *